(12) United States Patent
Hwang

(10) Patent No.: US 6,492,794 B2
(45) Date of Patent: Dec. 10, 2002

(54) TECHNIQUE FOR LIMITING CURRENT THROUGH A REACTIVE ELEMENT IN A VOLTAGE CONVERTER

(75) Inventor: Jeffrey H. Hwang, Saratoga, CA (US)

(73) Assignee: Champion Microelectronic Corp. (TW)

( * ) Notice: Subject to any disclaimer, the term of this patent is extended or adjusted under 35 U.S.C. 154(b) by 0 days.

(21) Appl. No.: 09/823,836

(22) Filed: Mar. 30, 2001

(65) Prior Publication Data

US 2002/0140408 A1 Oct. 3, 2002

(51) Int. Cl.$^7$ ................................................ G05F 1/40
(52) U.S. Cl. ........................ 323/285; 323/284; 323/224
(58) Field of Search ................. 323/282, 283, 323/284, 285

(56) References Cited

U.S. PATENT DOCUMENTS

| | | | |
|---|---|---|---|
| 5,396,165 A | 3/1995 | Hwang et al. | 323/210 |
| 5,565,761 A | 10/1996 | Hwang | 323/222 |
| 5,592,128 A | 1/1997 | Hwang | 331/61 |
| 5,742,151 A | 4/1998 | Hwang | 323/222 |
| 5,747,977 A | 5/1998 | Hwang | 323/284 |
| 5,798,635 A | 8/1998 | Hwang et al. | 323/222 |
| 5,804,950 A | 9/1998 | Hwang et al. | 323/222 |
| 5,818,207 A | 10/1998 | Hwang | 323/288 |
| 5,894,243 A | 4/1999 | Hwang | 327/540 |
| 5,903,138 A | 5/1999 | Hwang et al. | 323/266 |
| 6,091,233 A | 7/2000 | Hwang et al. | 323/222 |
| 6,166,528 A * | 12/2000 | Rossetti et al. | 323/283 |
| 6,215,290 B1 * | 4/2001 | Yang et al. | 323/282 |
| 6,307,356 B1 * | 10/2001 | Dwelley | 323/282 |

* cited by examiner

*Primary Examiner*—Shawn Riley
(74) *Attorney, Agent, or Firm*—Derek J. Westberg

(57) ABSTRACT

A current limiting technique for a voltage converter. Parasitic resistance of an inductor in an input path to the converter is used to determine the level of current input to the converter. If the measured current level is excessive, then switching in the converter may be interrupted until the current falls to an acceptable level. A modulated input current passes through an inductor of a voltage converter. An input voltage at a first terminal of the inductor is filtered and compared to an output voltage formed at a second terminal of the inductor. The difference in these values is indicative of a voltage across the parasitic resistor and, thus, is indicative of the input current. When the difference exceeds a predetermined level, the input current may be interrupted until the current in the inductor falls to an acceptable level. Current in one or both directions may be monitored for an excessive level. In addition, hysteresis may be employed so as to cause the current in the inductor to fall to a level that is somewhat below the predetermined level before enabling the input current.

25 Claims, 3 Drawing Sheets

TECHNIQUE FOR LIMITING CURRENT THROUGH A REACTIVE ELEMENT IN A VOLTAGE CONVERTER

FIELD OF THE INVENTION

The present invention relates to the field of voltage converters. More particularly, the present invention relates to prevention of over-current conditions in voltage converters.

BACKGROUND OF THE INVENTION

In a conventional voltage converter, an output voltage is typically monitored, compared to a predetermined desired level and a response is developed to more precisely attain the desired output voltage. More particularly, to adjust the output voltage, the input current is modulated up or down. Conventional modulation techniques include pulse-width modulation (PWM) and frequency modulation.

FIG. 1 illustrates a voltage converter of the prior art. An unregulated direct-current DC voltage source Vin1 is coupled to a first terminal of a switch SW1. A second terminal of the switch SW1 is coupled to a first terminal of an inductor L1 and to a first terminal of a switch SW2. A second terminal of the inductor L1 is coupled to a first terminal of an output capacitor C1. A second terminal of the switch SW2 and a second terminal of the capacitor C1 are coupled to ground.

When the switch SW1 is closed, the switch SW2 is open. Under these conditions, current flows from the input source Vin1 through the inductor L1 and charges the capacitor C1. Thus, an output voltage Vout1 formed across the capacitor C1 tends to increase. When the switch SW1 is open, the switch SW2 is closed. Under these conditions, current from the capacitor C1 flows through the inductor L1 and to ground. Thus, the output voltage Vout1 tends to decrease. A load 10 coupled across the capacitor C1 is powered by the voltage converter.

A first terminal of a resistor R1 is coupled to the first terminal of the capacitor C1. A second terminal of the resistor R1 is coupled to a first terminal of a resistor R2. A second terminal of the resistor R2 is second terminal of the capacitor C1.

The resistors R1 and R2 form a voltage divider, in which a voltage formed at an intermediate node is proportional to the output voltage Vout1. This voltage is coupled to an inverting input of an amplifier 12. A reference voltage Vref1 is coupled to a non-inverting input of the amplifier 12. The amplifier 12 forms an error signal Veao1 that is representative of a difference between the output voltage Vout1 and a desired level for the output voltage Vout1.

The error signal Veao1 is coupled to a non-inverting input of a comparator 14. A periodic ramp signal Vramp1 formed by an oscillator 16 is coupled to an inverting input of the comparator 14. The comparator 14 forms a switch control signal Vsw1 that is coupled to the switch SW1 and to an input of an inverter 18. An output of the inverter 18 is coupled to the switch SW2.

As can be seen from FIG. 1, when the error signal Veao1 is higher than the ramp signal Vramp1, the switch control signal Vsw1 is a logic high voltage. Under these conditions, the switch SW1 is closed and the switch SW2 is open. When the error signal Veao1 is lower than the ramp signal Vramp1, the switch control signal Vsw1 is a logic low voltage. Under these conditions, the switch SW1 is open and the switch SW2 is closed.

The ramp signal Vramp1 rises steadily to a maximum level and then rapidly discharges to a minimum level before the cycle repeats. The error signal Veao1 generally remains between maximum and minimum levels of the ramp signal Vramp1. Thus, for each cycle of the ramp signal Vramp1, the switches SW1 and SW2 cycle between opened and closed.

When the output voltage Vout1 decreases, the error signal Veao1 increases. This increases the duty cycle for the switch SW1 and, thus, increases the output voltage Vout1. When the output voltage Vout1 increases, the error signal Veao1 decreases. This decreases the duty cycle for the switch SW1 and, thus, decreases the output voltage Vout1. Accordingly, the output voltage Vout1 is regulated in a feedback loop.

If the output voltage Vout1 is significantly below the desired level, then the switch SW1 may be closed for a significant portion of the time. As a result, the input current can be of a large magnitude. Further, if the input voltage Vin1 should rise unexpectedly, this can also contribute to a large input current. A large input current may cause damage to elements of the converter, such as the switch SW1. Accordingly, it may be desirable to provide a technique for limiting the input current to the converter.

Therefore, what is needed is a technique for limiting the input current to a voltage converter. It is to these ends that the present invention is directed.

SUMMARY OF THE INVENTION

The invention is a current limiting technique for a voltage converter. Parasitic resistance of an inductor in an input path to the converter is used to determine the level of current input to the converter. If the measured current level is excessive, then switching in the converter may be interrupted until the current falls to an acceptable level. Because parasitic resistance is used to detect the input current, rather than a dedicated sensing resistor, fewer components are required. Thus, implementation of the converter and its associated control circuitry is simplified.

In accordance with an aspect of the invention, a modulated input current passes through an inductor of a voltage converter. Associated with the inductor is an inductance value and a parasitic resistance value. An input voltage at a first terminal of the inductor is filtered and compared to an output voltage formed at a second terminal of the inductor. The difference in these values is indicative of a voltage across the parasitic resistor and, thus, is indicative of the input current. When the difference exceeds a predetermined reference level, the input current may be interrupted until the current in the inductor falls to an acceptable level. Current in one or both directions may be monitored for an excessive level. In addition, hysteresis may be employed so as to cause the current in the inductor to fall to a level that is a predetermined amount below the reference level before enabling the input current. Such hysteresis may reduce the frequency in which the input current is interrupted.

DETAILED DESCRIPTION OF A PREFERRED EMBODIMENT

Figure 1:
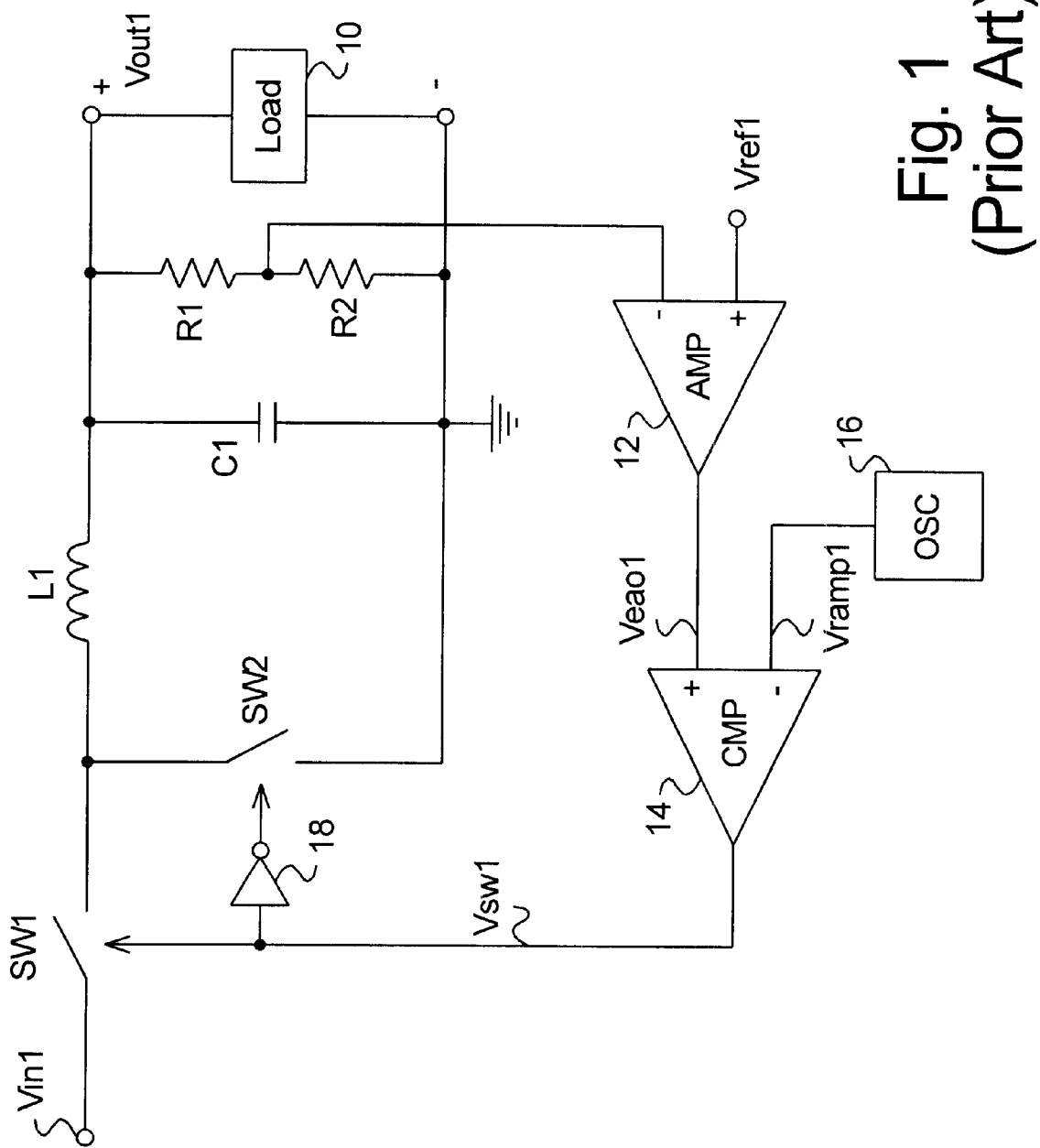
FIG. 1 illustrates a voltage converter of the prior art.
Figure 2:
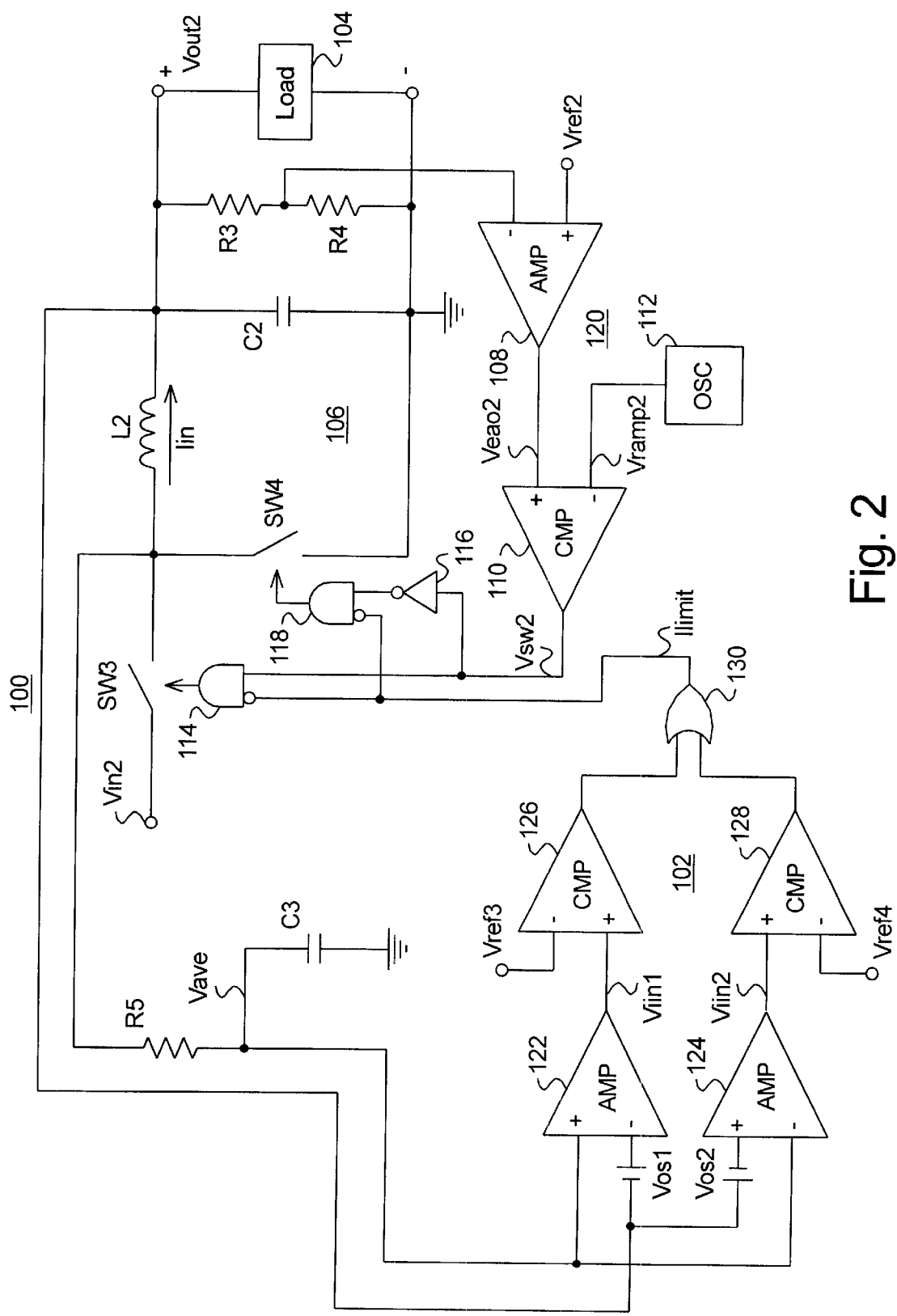
FIG. 2 illustrates a voltage converter including current-limiting circuitry in accordance with the present invention.

FIG. 2 illustrates a voltage converter 100 including current-limiting circuitry 102 in accordance with the present invention. The voltage converter 100 is coupled to receive power from a power source Vin. The source Vin may be, for example, an unregulated direct-current (DC) supply, such as a battery or a rectified alternating current (AC) signal. The source Vin2 may be coupled to a first terminal of a switch SW3. A second terminal of the switch SW3 may be coupled to a first terminal of a reactive element, such as an inductor L2. The second terminal of the switch SW3 may also be coupled to a first terminal of a switch SW4. A second terminal of the inductor L2 may be coupled to a first terminal of a reactive element, such as an output capacitor C2. A second terminal of the switch SW4 and a second terminal of the capacitor C2 may be coupled to a ground node.

When the switch SW3 is closed, the switch SW4 is open. Under these conditions, an input current Iin flows from the input source Vin2 through the inductor L2 and charges the capacitor C2. Thus, an output voltage Vout2 formed across the capacitor C2 tends to increase. When the switch SW3 is open, the switch SW4 is closed. Under these conditions, current from the capacitor C2 flows through the inductor L2 and to ground. Thus, the output voltage Vout2 tends to decrease. A load 104 coupled across the capacitor C2 may be powered by the voltage converter 100.

The switches SW3 and SW4, the inductor L2 and the capacitor C2 form a buck converter power conversion section 106 of the converter 100. It will be apparent that the power conversion section 106 is exemplary and that advantages of the invention may be achieved using a power conversion section 106 that has a different topology from that of FIG. 2. For example, the power conversion section 106 may include a boost converter or another type of buck converter.

A first terminal of a resistor R3 may be coupled to the first terminal of the capacitor C2. A second terminal of the resistor R3 may be coupled to a first terminal of a resistor R4. A second terminal of the resistor R4 may be coupled to a second terminal of the capacitor C2.

The resistors R3 and R4 form a voltage divider, in which a voltage formed at an intermediate node is proportional to the output voltage Vout2. This output voltage sensing signal may be coupled to an inverting input of an amplifier 108. A reference voltage Vref2 may be coupled to a non-inverting input of the amplifier 108. The amplifier 108 forms an error signal Veao2 that is representative of a difference between the output voltage Vout2 and a desired level for the output voltage Vout2.

The error signal Veao2 may be coupled to a non-inverting input of a comparator 110. A periodic ramp signal Vramp2, formed by an oscillator 112, may be coupled to an inverting input of the comparator 110. The comparator 110 may form a switch control signal Vsw2. The switch control signal Vsw2 may be coupled to the switch SW3 via a logic AND gate 114 and to the switch SW4 via an inverter 116 and a logic AND gate 118.

Under normal operating conditions, in absence of an over-current condition, the logic gate 114 passes the switch control signal Vsw2 to the switch SW3 and the logic gate 118 passes the switch control signal Vsw2, as inverted by the inverter 116, to the switch SW4. Thus, when the error signal Veao2 is higher than the ramp signal Vramp2, the switch control signal Vsw2 is a logic high voltage. Under these conditions, the switch SW3 is closed and the switch SW4 is open. When the error signal Veao2 is lower than the ramp signal Vramp2, the switch control signal Vsw2 is a logic low voltage. Under these conditions, the switch SW3 is open and the switch SW4 is closed.

The ramp signal Vramp2 may rise steadily to a maximum level and then rapidly discharge to a minimum level before the cycle repeats. The error signal Veao2 generally remains between maximum and minimum levels of the ramp signal Vramp2. Thus, for each cycle of the ramp signal Vramp2, the switches SW3 and SW4 cycle between opened and closed.

When the output voltage Vout2 decreases, the error signal Veao2 increases. This increases the duty cycle for the switch SW3 and, thus, increases the output voltage Vout2. When the output voltage Vout2 increases, the error signal Veao2 decreases. This decreases the duty cycle for the switch SW3 and, thus, decreases the output voltage Vout2. Accordingly, the output voltage Vout2 is regulated in a feedback loop. The output voltage Vout2 may be adjusted by adjusting the level of the reference voltage Vref2 or the values of the resistors R3 or R4.

The resistors R3 and R4, the amplifier 108, the comparator 110, oscillator 112 and inverter 116 form a control section 120 of the converter 100. It will be apparent that the control section 120 is exemplary and that advantages of the invention may be achieved using control section 120 that differs from that of FIG. 2. For example, input polarities of the amplifier 108 and/or comparator 10 may be exchanged. As another example, additional elements may be added, such as a latch that forms the switch control signal Vsw2 based upon the output of the comparator 110 and a clock signal that is synchronous with the ramp signal Vramp2.

The current limiting section 102 of the converter 100 may include a resistor R5 and a capacitor C3. A first terminal of the resistor R5 may be coupled to the first terminal of the inductor L2. A second terminal of the resistor R5 may be coupled to a first terminal of a capacitor C3. A second terminal of the capacitor C3 may be coupled to the ground node. The resistor R5, and capacitor C3 form an R-C low-pass filter, in which a signal Vave formed at the node between the resistor R5 and the capacitor C3 is representative of an average level of input voltage applied to the first terminal of the inductor L2. Values for the resistor R5 and capacitor C3 are preferably selected such that the signal Vave is representative of an average of the voltage applied to the first terminal of the inductor L2 over time period of between a few and several cycles of the switch control signal Vsw2.

The current limiting section 102 may also include offset voltage sources Vos1, Vos2, amplifiers 122, 124, comparators 126, 128 and logic gate 130. The signal Vave may be coupled to a non-inverting input of the amplifier 122 and to an inverting input of the amplifier 124. The second terminal of the inductor L2 may be coupled to a first terminal of the offset voltage source Vos1 and to a first terminal of the offset voltage source Vos2. A second terminal of the offset voltage source Vos1 may be coupled to an inverting input of the amplifier 122, while a second terminal of the offset voltage source Vos2 may be coupled to a non-inverting input of an amplifier 124. The amplifier 122 may form a signal Viin1 at its output, while the amplifier 124 may form a signal Viin2 at its output.

An exemplary value for the parasitic resistance of the inductor L2 is 50 milliohms. An exemplary steady-state current drawn by the load 104 and, thus, the average current Iin through the inductor L2, is 10 amps. Accordingly, the expected voltage drop across the parasitic resistance of the inductor L2 may be equal to 500 millivolts (50 milliohms× 10 amps). Based on these exemplary values, the offset voltage source Vos1 may be selected to be 500 millivolts, for example, while the offset voltage source Vos2 may be selected to be −500 millivolts, for example.

When the load 104 is drawing steady-state current, the average of the input current Iin is flowing in a forward direction, i.e. from the first terminal of the inductor L2 to the second terminal of the inductor L2. Under these conditions, the signal Vave may be expected to be approximately 500 millivolts higher than the level at the second terminal of the inductor L2 due to the voltage drop across the parasitic resistance of the inductor L2. The offset voltage source Vos1 may increase the signal level at the second terminal of the inductor L2 by approximately 500 millivolts. As such, the voltage differential applied across inputs of the amplifier 122 is approximately zero volts. Accordingly, the signal Viin1 is representative of a level of current flowing through the inductor L2 in the forward direction and is expected to be approximately zero volts.

Under these conditions, the signal Viin2 is representative of a level of current flowing through the inductor L2 in the reverse direction and is expected to be a negative value below zero. This is because the signal Vave coupled to the inverting input of the amplifier 124 is expected to be approximately 500 millivolts higher than the voltage at the second terminal of the inductor L2 due to the voltage drop across the inductor L2. The offset voltage source Vos2 reduces the signal level at the non-inverting input of the amplifier 124. As such, the non-inverting input is expected to be approximately 1000 millivolts (1 volt) lower than the voltage at the inverting input.

The signal Viin1 at the output of the amplifier 122 may be coupled to a non-inverting input of the comparator 126. A reference voltage Vref3 may be coupled to an inverting input of the comparator 126. The signal Viin2 at the output of the amplifier 124 may be coupled to a non-inverting input of the comparator 128. A reference voltage Vref4 may be coupled to an inverting input of the comparator 128. Thus, under the above-described conditions in which the load 104 draws a steady-state current, the signal Viin1 may be below the level of Vref3, while the signal Viin2 may be below the level of Vref4. Accordingly, the outputs of the comparators 126 and 128 may both be a logic low voltage.

The output of the comparator 126 may be coupled to a first input of a logic OR gate 130, while the output of the comparator 128 may be coupled to a second input of the logic OR gate 130. The logic OR gate 130 may form a current-limiting signal limit at its output. When the outputs of the comparators 126 and 128 are both a logic low voltage, then the signal Ilimit may also be a logic low voltage. Accordingly, the AND gate 114 passes the switch control signal Vsw2 to the switch SW3 and the logic AND gate 118 passes the inverted switch control signal Vsw2 to the switch SW4. Thus, when the signal Ilimit is logic low voltage, switching in the voltage converter section 106 is enabled.

Should the average current Iin through the inductor L2 exceed its steady-state level, the level of Vave rises. As a result, the signal Viin1 at the output of the amplifier 122 rises. Eventually, the signal Viin1 may exceed the level of Vref3, which may be set to a level representative of a maximum allowable current so as to avoid damaging elements of the converter 100. When this occurs, the output of the comparator 126 may transition to a logic high voltage, which causes the signal Ilimit to transition to a logic high voltage. As a result, the switches SW3 and SW4 may both be held open until the input current Iin falls sufficiently to cause the signal Viin1 to fall below the level of Vref3. When the input current falls sufficiently, the signal Ilimit may return to a logic low voltage and switching of the switches SW3 and SW4 may resume. Thus, when the signal Ilimit is logic high voltage, switching in the voltage converter section 106 may be disabled.

Thus, a technique for limiting the input current Iin in the power conversion section 106 has been described, in which the input current Iin is sensed by monitoring an average voltage across the inductor L2. It will be apparent that the circuitry by which switching is disabled, e.g., current limiting section 102 and logic AND gates 114 and 118, may be altered from that shown in FIG. 2, while still achieving the principal objects of the invention. For example, hysteresis may be employed in the comparator 126 so as to cause the current Iin in the inductor L2 to fall to a level that is a predetermined amount below the reference level before re-enabling switching of the switches SW3 and SW4. Such hysteresis may reduce the frequency in which the input current Iin is interrupted. As another example, rather than disabling switching entirely in response to an over-current condition, switching may be resumed at a reduced duty-cycle to limit the input current Iin, such as a predetermined minimum duty cycle. This may be achieved by setting the error signal Veao2 to a predetermined level in response to the signal Ilimit transitioning to a logic high voltage.

Further, under conditions where the output voltage Vout2 exceeds the predetermined desired level, the average input current Iin may be in the reverse direction, i.e. from the second terminal of the inductor L2 to the first terminal of the inductor L2. As a result, the voltage at the second terminal of the inductor L2 may exceed the signal Vave due to the parasitic resistance of the inductor L2. For example, the voltage at the second terminal of the inductor L2 may exceed the signal Vave by 500 millivolts, assuming a reverse current through the inductor L2 of 10 amps.

Under these conditions, the signal Viin1 is expected to be a negative value below zero. This is because the signal Vave coupled to the non-inverting input of the amplifier 122 is expected to be approximately 500 millivolts lower than the voltage at the second terminal of the inductor L2 due to the voltage drop across the inductor L2. The offset voltage source Vos1 increases the signal level at the inverting input of the amplifier 122. As such, the inverting input is expected to be approximately 1000 millivolts (1 volt) higher than the voltage at the non-inverting input.

However, the signal Viin2 is expected to be around zero volts. This is because the signal Vave may be expected to be approximately 500 millivolts lower than the level at the second terminal of the inductor L2 due to the voltage drop across the parasitic resistance of the inductor L2. The offset voltage source Vos2 may decrease the signal level at the second terminal of the inductor L2 by approximately 500 millivolts. As such, the voltage differential applied across inputs of the amplifier 124 is approximately zero volts.

Should the average reverse current Iin through the inductor L2 continue to rise, the signal Viin2 at the output of the amplifier 124 rises. Eventually, the signal Viin2 may exceed the level of Vref4, which may be set to a level representative of a maximum allowable reverse current so as to avoid damaging elements of the converter 100. When this occurs, the output of the comparator 128 may transition to a logic high voltage, which causes the signal Ilimit to transition to a logic high voltage. As a result, the switches SW3 and SW4 may be inhibited from switching until the reverse current Iin falls sufficiently to cause the signal Viin2 to fall below the level of Vref4. When the input current falls sufficiently, the signal Ilimit may return to a logic low voltage and switching of the switches SW3 and SW4 may resume.

Thus, a technique for limiting the input current Iin flowing in the reverse direction in the power conversion section 106 by monitoring an average voltage across the inductor L has been described 2. Hysteresis may also be employed in the comparator 128 so as to cause the current Iin in the inductor L2 to fall to a level that is a predetermined amount below the reference level before re-enabling switching of the switches SW3 and SW4.

Figure 3:
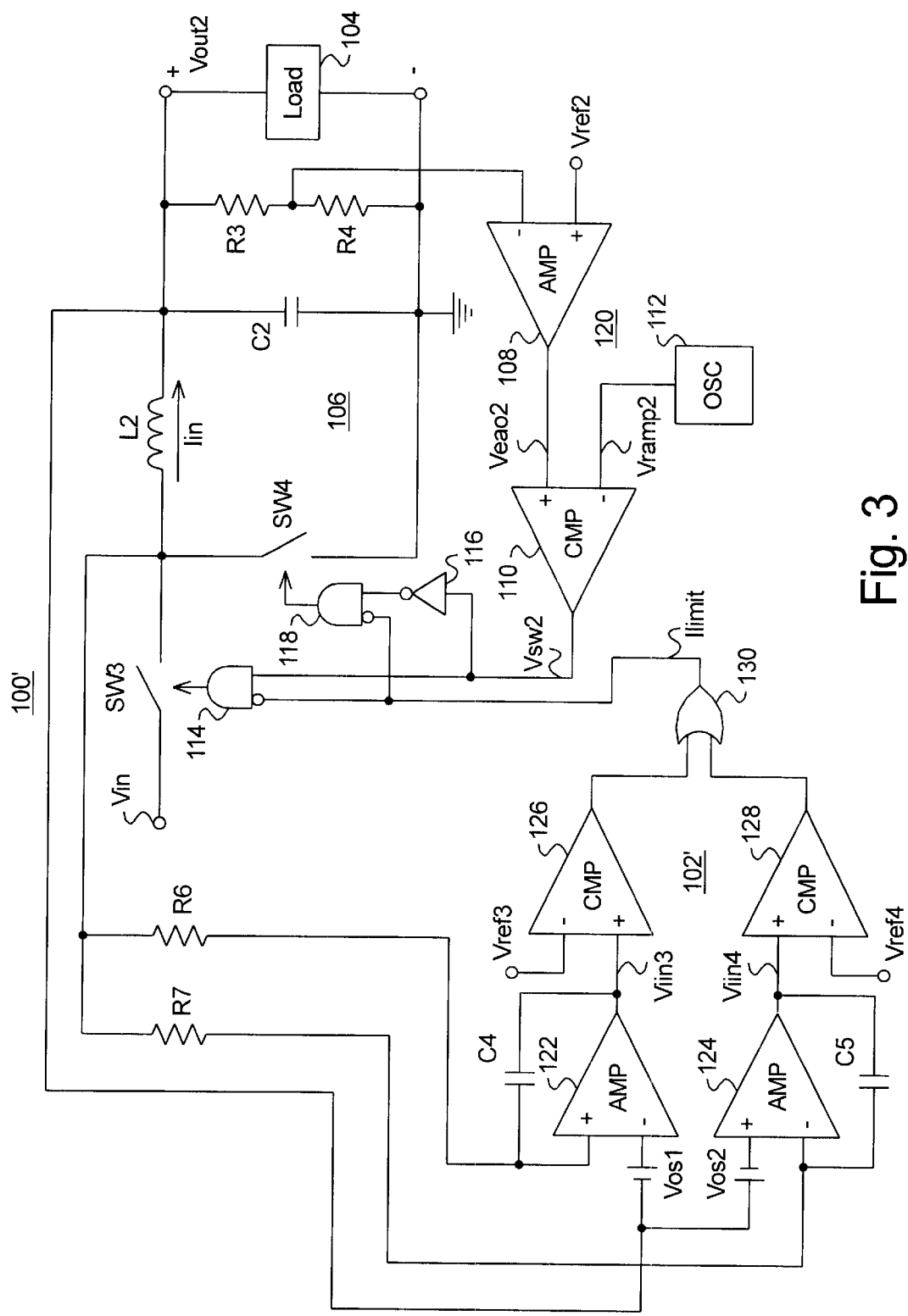
FIG. 3 illustrates a voltage converter including an alternate embodiment of current-limiting circuitry in accordance with the present invention.

FIG. 3 illustrates a voltage converter 100' including an alternate embodiment of current-limiting circuitry 102' in accordance with the present invention. As shown in FIG. 3, the current limiting section 102' may include offset voltage sources Vos1, Vos2, resistors R6, R7, capacitors C4, C5, amplifiers 122, 124, comparators 126, 128 and logic gate 130. A first terminal of the resistor R6 and a first terminal of the resistor R7 may be coupled to the first terminal of the inductor L2.

A second terminal of the resistor R6 may be coupled to the non-inverting input of the amplifier 122 and to a first terminal of the capacitor C4. The output terminal of the amplifier 122 may form a signal Viin3 and may be coupled to a second terminal of the capacitor C4. The second terminal of the inductor L2 may be coupled to a first terminal of the offset voltage source Vos1 and to a first terminal of the offset voltage source Vos2. A second terminal of the source Vos1 may be coupled to the inverting input terminal of the amplifier 122.

Accordingly, the amplifier 122 may be configured as an integrator or low-pass filter. As such, the signal Viin3 may be representative of an average voltage across the inductor L2, offset by the source Vos1. Thus, the signal Viin3 may be representative of a level of current flowing in the inductor L2 in the forward direction. Under exemplary steady-state conditions where the load 104 draws 10 amps of current and the offset source Vos1 is approximately equal to a voltage expected across parasitic resistance of the inductor, i.e. 500 millivolts, the signal Viin3 is expected to be approximately zero volts.

The signal Viin3 may be coupled to a non-inverting input of the comparator 126, while the reference voltage Vref3 may be coupled to an inverting input of the comparator 126. Thus, under the above-described conditions in which the load 104 draws a steady-state current, the signal Viin3 may be below the level of Vref3. However, should the input current Iin rise, then the signal Viin3 may also rise. Eventually, the signal Viin3 may exceed a level of Vref3. In which case, the output of the comparator 126 may transition to a logic high voltage. As a result, the current-limiting signal Ilimit may also transition logic high voltage, inhibiting switching of the switches SW3 and SW4 until the input current Iin falls sufficiently that the output of the comparator 126 returns to a logic low voltage.

Similarly, a second terminal of the resistor R7 may be coupled to the inverting input of the amplifier 124 and to a first terminal of the capacitor C5. The output terminal of the amplifier 124 may form a signal Viin4 and may be coupled to a second terminal of the capacitor C5. A second terminal of the offset voltage source Vos2 may be coupled to the inverting input terminal of the amplifier 124.

Accordingly, the amplifier 124 may be configured as an integrator or low-pass filter. As such, the signal Viin4 may be representative of an average voltage across the inductor L2, offset by the source Vos2. Thus, the signal Viin4 may be representative of a level of current flowing the inductor L2 in the reverse direction. Under exemplary reverse-current conditions where 10 amps of current flows from the second terminal of the inductor L2 to the first terminal of the inductor L2, the signal Viin4 is expected to be approximately zero volts.

The signal Viin4 may be coupled to a non-inverting input of the comparator 128, while the reference voltage Vref4 may be coupled to an inverting input of the comparator 128. Thus, under the above-described conditions, the signal Viin4 may be below the level of Vref4. However, should the reverse current Iin rise, then the signal Viin4 may also rise. Eventually, the signal Viin4 may exceed a level of Vref4. In which case, the output of the comparator 128 may transition to a logic high voltage. As a result, the current-limiting signal Ilimit may also transition logic high voltage, inhibiting switching of the switches SW3 and SW4 until the reverse current Iin falls sufficiently that the output of the comparator 128 returns to a logic low voltage.

Thus, an alternate technique for limiting the input current Iin in the power conversion section 106 has been described, in which the input current Iin is sensed by monitoring an average voltage across the inductor L2. It will be apparent that the circuitry by which switching is inhibited, e.g., current limiting section 102' and logic AND gates 114 and 118, may be altered from that shown in FIG. 3, while still achieving the principal objects of the invention. For example, hysteresis may be employed in the comparators 126 and 128 so as to cause the current Iin in the inductor L2 to fall to a level that is somewhat below the predetermined level before re-enabling switching of the switches SW3 and SW4. As another example, rather than disabling switching entirely in response to an over-current condition, switching may be resumed at a reduced duty-cycle, such as a predetermined minimum duty cycle.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method of limiting a current through a reactive element in a voltage converter, comprising:
   switching current from a supply through a reactive element by repeatedly opening and closing a switch in accordance with a switch control signal for forming a regulated output voltage in a feedback loop;
   sensing an average voltage formed at a first terminal of the reactive element;
   sensing a voltage formed at a second terminal of the reactive element;
   forming a first signal that is representative of a difference between the average voltage formed at the first terminal of the reactive element and the voltage formed at the second terminal of the reactive element;
   comparing the first signal to a first reference level for determining whether current through the reactive element is excessive; and
   disabling said switching in response to the first signal exceeding the first reference level, said switching being disabled until after said current through the reactive element falls to an acceptable level.

2. The method according to claim 1, said switch control signal having a variable duty cycle.

3. The method according to claim 1, wherein said average voltage is taken over a time period of between a few and several cycles of the switch control signal.

4. The method according to claim 1, further comprising enabling said switching when the signal falls below the first reference level.

5. The method according to claim 1, further comprising enabling said switching when the signal falls below the first reference level by a predetermined amount.

6. The method according to claim 1, wherein the first signal is representative of a level of current passing through the reactive element in a first direction.

7. The method according to claim 6, further comprising:
forming a second signal that is representative of a level of current passing through the reactive element in a second direction opposite the first direction;
comparing the second signal to a second reference level; and
disabling said switching when the second signal exceeds the second reference level.

8. An apparatus for limiting current through a reactive element in a voltage converter, comprising:
a switch coupled to a first terminal of a reactive element for switching current from a supply through the reactive element in accordance with a switch control signal, the switch repeatedly opening and closing in response to the switch control signal for forming a regulated output voltage in a feedback loop;
a filter for forming a first signal coupled to a first terminal of the reactive element;
an amplifier having a first input terminal coupled to receive the first signal and a second input terminal coupled to receive a second signal that is representative of a voltage at a second terminal of the reactive element wherein the first amplifier forms a third signal that is representative of a level of current flowing through the reactive element;
a comparator for comparing the third signal to a predetermined reference level for determining whether current through the reactive element is excessive, wherein the first comparator forms a fourth signal; and
inhibiting circuitry for inhibiting the input current by holding the switch open in response to the fourth signal for at least as long as the third signal exceeds the reference level, thereby allowing said input current to fall to an acceptable level.

9. The apparatus according to claim 8, further comprising a pulse width modulation circuit for forming the switch control signal.

10. The apparatus according to claim 8, wherein the first signal is representative of an average voltage over a time period of several cycles of the switch control signal.

11. The apparatus according to claim 8, wherein the comparator has a hysteretic characteristic.

12. An apparatus for limiting current through a reactive element in a voltage converter, comprising:
a switch coupled to a first terminal of a reactive element for switching current from a supply through the reactive element in accordance with a switch control signal, the switch repeatedly opening and closing in response to the switch control signal for forming a regulated output voltage in a feedback loop;
an amplifier having a first input terminal coupled to receive a first signal from the first terminal of the reactive element and a second input terminal coupled to receive a second signal that is representative of a voltage at a second terminal of the reactive element wherein the amplifier functions as a low pass filter with respect to the first signal and forms a third signal at its output that is representative of a level of current flowing through the reactive element;
a comparator for comparing a signal formed by the amplifier to a predetermined reference level for determining whether current through the reactive element is excessive, wherein the comparator forms a fourth signal; and
inhibiting circuitry for disabling switching of the switch in response to the fourth signal, said switching being disabled until after said current through the reactive element falls to an acceptable level.

13. The apparatus according to claim 12, further comprising a pulse width modulation circuit for forming the switch control signal.

14. The apparatus according to claim 12, wherein the third signal is representative of an average voltage over a time period of several cycles of the switch control signal.

15. The apparatus according to claim 12, wherein the comparator has a hysteretic characteristic.

16. An apparatus for limiting current through a reactive element in a voltage converter, comprising:
a switch coupled to a reactive element for switching current from a supply through the reactive element in accordance with a switch control signal, the switch repeatedly opening and closing in response to the switch control signal for forming a regulated output voltage in a feedback loop;
a filter for forming a first signal coupled to a first terminal of the reactive element;
a first amplifier having a first input terminal coupled to receive the first signal and a second input terminal coupled to receive a second signal that is representative of a voltage at a second terminal of the reactive element wherein the second signal is offset from the voltage at the second terminal of the reactive element by a first offset voltage level and wherein the first amplifier forms a third signal that is representative of a level of current flowing through the reactive element in a first direction;
a first comparator for comparing the third signal to a first predetermined reference level for determining whether current through the reactive element is excessive, wherein the first comparator forms a fourth signal;
a second amplifier having a first input terminal coupled to receive the first signal and a second input terminal coupled to receive a fifth signal that is representative of a voltage at the second terminal of the reactive element wherein the fifth signal is offset from the voltage at the second terminal of the reactive element by a second offset voltage level and wherein the second amplifier forms a sixth signal that is representative of a level of current flowing through the reactive element in a second direction opposite the first direction;
a second comparator for comparing the sixth signal to a second predetermined reference level for determining whether the current through the reactive element is excessive, wherein the second comparator forms a seventh signal; and
inhibiting circuitry for disabling switching of the switch in response to the fourth or seventh signals, said switching being disabled until after said current through the reactive element falls to an acceptable level.

17. The apparatus according to claim 16, further comprising a pulse width modulation circuit for forming the switch control signal.

18. The apparatus according to claim 16, wherein the first signal is representative of an average voltage over a time period of several cycles of the switch control signal.

19. The apparatus according to claim 16, wherein the first and second comparators have hysteretic characteristics.

20. The apparatus according to claim 16, wherein the first offset voltage level is representative of a voltage formed across the reactive element under steady-state load conditions.

21. An apparatus for limiting current through a reactive element in a voltage converter, comprising:
- a switch coupled to a first terminal of a reactive element for switching current from a supply through the reactive element in accordance with a switch control signal, the switch repeatedly opening and closing in response to the switch control signal for forming a regulated output voltage in a feedback loop;
- a first amplifier having a first input terminal coupled to receive a first signal from a first terminal of the reactive element and a second input terminal coupled to receive a second signal that is representative of a voltage at a second terminal of the reactive element wherein the second signal is offset from the voltage at the second terminal of the reactive element by a first offset voltage level and wherein the first amplifier functions as a low pass filter with respect to the first signal and forms a third signal at its output that is representative of a level of current flowing through the reactive element in a first direction;
- a first comparator for comparing a signal formed by the first amplifier to a first predetermined reference level for determining whether current through the reactive element is excessive, wherein the comparator forms a fourth signal;
- a second amplifier having a first input terminal coupled to receive a fifth signal from a first terminal of the reactive element and a second input terminal coupled to receive a sixth signal that is representative of a voltage at a second terminal of the reactive element wherein the sixth signal is offset from the voltage at the second terminal of the reactive element by a second offset voltage level and wherein the second amplifier functions as a low pass filter with respect to the fifth signal and forms a seventh signal at its output that is representative of a level of current flowing through the reactive element in a first direction;
- a second comparator for comparing a signal formed by the second amplifier to a second predetermined reference level for determining whether the current through the reactive element is excessive, wherein the comparator forms a eighth signal; and
- inhibiting circuitry for disabling switching of the switch in response to the fourth or eight signals, said switching being disabled until after said current through the reactive element falls to an acceptable level.

22. The apparatus according to claim 21, further comprising a pulse width modulation circuit for forming the switch control signal.

23. The apparatus according to claim 21, wherein the third signal is representative of an average voltage over a time period of several cycles of the switch control signal.

24. The apparatus according to claim 21, wherein the first and second comparators have hysteretic characteristics.

25. The apparatus according to claim 21, wherein the first offset voltage level is representative of a voltage formed across the reactive element under steady-state load conditions.

* * * * *